United States Patent
Lee et al.

(10) Patent No.: US 9,781,240 B2
(45) Date of Patent: Oct. 3, 2017

(54) METHOD AND USER TERMINAL FOR PERFORMING CALL USING VOICE RECOGNITION

(71) Applicant: Samsung Electronics Co., Ltd., Suwon-si (KR)

(72) Inventors: Jihyun Lee, Hwaseong-si (KR); Hyun-Jun Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/644,250

(22) Filed: Mar. 11, 2015

(65) Prior Publication Data
US 2016/0050305 A1 Feb. 18, 2016

(30) Foreign Application Priority Data
Aug. 12, 2014 (KR) ........................ 10-2014-0104304

(51) Int. Cl.
| | |
|---|---|
| *H04B 1/38* | (2015.01) |
| *H04M 1/60* | (2006.01) |
| *H04M 3/428* | (2006.01) |
| *H04M 1/64* | (2006.01) |
| *G10L 15/22* | (2006.01) |

(52) U.S. Cl.
CPC ......... *H04M 1/6041* (2013.01); *H04M 1/642* (2013.01); *H04M 3/4288* (2013.01); *G10L 2015/223* (2013.01); *H04M 2250/74* (2013.01)

(58) Field of Classification Search
USPC ............ 455/563, 569.1, 567, 550.1; 379/80, 379/88.01
See application file for complete search history.

(56) References Cited

U.S. PATENT DOCUMENTS

| | | | |
|---|---|---|---|
| 5,267,323 A | 11/1993 | Kimura | |
| 6,169,796 B1 * | 1/2001 | Bauer .................. | H04M 3/428 370/352 |
| 6,212,408 B1 * | 4/2001 | Son ....................... | H04M 1/271 379/355.01 |
| 6,304,634 B1 | 10/2001 | Hollier et al. | |
| 7,133,503 B2 * | 11/2006 | Revisky ............... | H04M 1/658 379/211.02 |
| 7,483,831 B2 | 1/2009 | Rankovic | |
| 8,433,579 B1 | 4/2013 | Duran | |
| 8,731,912 B1 * | 5/2014 | Tickner ................ | H04M 19/04 704/208 |

(Continued)

FOREIGN PATENT DOCUMENTS

| | | |
|---|---|---|
| EP | 1 085 500 B1 | 1/2007 |
| JP | 5188558 B2 | 4/2013 |
| KR | 10-0331829 B1 | 4/2002 |

(Continued)

*Primary Examiner* — Fayyaz Alam
(74) *Attorney, Agent, or Firm* — NSIP Law (57) ABSTRACT

A method and a user terminal for performing a call using voice recognition are disclosed. The method and the user terminal include receiving a call request, obtaining a voice signal from a user in response to the call request, and determining whether the obtained voice signal is a call reception command to receive the call. The method and the user terminal perform the call in a handsfree mode based on the call request in response to the voice signal being the call reception command.

23 Claims, 4 Drawing Sheets

(56) References Cited

U.S. PATENT DOCUMENTS

2011/0065484 A1\* 3/2011 Liu .................. H04M 1/72569
  455/569.2
2015/0365510 A1\* 12/2015 Moore .................. G10L 17/22
  704/275

FOREIGN PATENT DOCUMENTS

| KR | 10-0620103 B1 | 9/2006 |
| KR | 10-0757725 B1 | 9/2007 |
| KR | 10-0930039 B1 | 12/2009 |
| KR | 10-1151571 B1 | 5/2012 |
| KR | 10-2012-0072243 A | 7/2012 |
| KR | 10-1374961 B1 | 3/2014 |

\* cited by examiner

METHOD AND USER TERMINAL FOR PERFORMING CALL USING VOICE RECOGNITION

CROSS-REFERENCE TO RELATED APPLICATION

This application claims the benefit under 35 USC 119(a) of Korean Patent Application No. 10-2014-0104304, filed on Aug. 12, 2014, in the Korean Intellectual Property Office, the entire disclosure of which is incorporated herein by reference for all purposes.

BACKGROUND

1. Field

The following description relates to a method and a user terminal to perform a call using voice recognition.

2. Description of Related Art

A dissemination rate of mobile phones is steadily on the rise. In line with mobile phones widely used, services available through a mobile phone have diversified.

However, call-related functions of a mobile phone may not satisfy the needs of users. In a situation in which a user is unable to directly control a mobile phone using a hand, for example, when the mobile phone is located remotely from the user or when the user is preoccupied with another task, such as driving an automobile, despite a close proximity to the mobile phone, the user may have difficulty to perform a call in response to reception of an incoming call request. Accordingly, there is a desire for technology to perform a call although a user is unable to directly control a mobile phone using a hand.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method of a user terminal, the method including receiving a call request; obtaining a voice signal from a user in response to the call request; determining whether the obtained voice signal is a call reception command to receive the call; and performing the call in a handsfree mode based on the call request in response to the voice signal being the call reception command.

The method may also include determining a call connection status of the call.

The controlling may include determining the call connection status based on text obtained by recognizing a voice signal of the user or a voice signal received from a counterpart terminal, performing the call with the user terminal, and controlling the user terminal based on the determined call connection status.

The controlling may include determining the call connection status of a volume of the voice signal of the user and noise comprised in the voice signal, and controlling the user terminal based on the determined call connection status.

The controlling may include increasing, by a predetermined magnitude and based on the determined call connection status, a volume of a speaker outputting a voice signal received from a counterpart terminal, which performs the call with the user terminal.

Based on the determined call connection status, the controlling may include increasing, by a predetermined magnitude, a sensitivity of a microphone receiving a voice signal.

Based on the determined call connection status, the controlling may include increasing, by a predetermined magnitude, a strength of a noise filter to be applied to a voice signal.

When the voice signal is a call waiting command to place the call on hold, further including transmitting a call waiting message to a counterpart terminal requesting the call.

The transmitting of the call waiting message may include transmitting, as the call waiting message, text obtained by recognizing the voice signal or a voice signal corresponding to the call waiting command.

The performing of the call in the handsfree mode may include performing the call by detecting a touch from the user or a keypad input from the user.

In response to the touch or the keypad input being detected, the performing of the call in the handsfree mode may include transmitting a call waiting message to a counterpart terminal requesting the call, irrespective of whether the voice signal is the call reception command.

In accordance with an embodiment, there is provided a non-transitory computer-readable storage medium comprising a program including instructions to cause a computer to perform the method described above.

In accordance with an embodiment, there is provided a user terminal, including a communication module configured to receive a call request; a microphone configured to obtain a voice signal from a user in response to the call request; and a processor configured to determine whether the voice signal is a call reception command to receive a call. In response to the voice signal being the call reception command, the processor is configured to perform the call in a handsfree mode based on the call request.

The processor may be configured to control at least one of the microphone and a speaker by determining a call connection status of the call.

Based on the determined call connection status, the processor may be configured to determine the call connection status based on a voice signal of the user or text obtained by recognizing a voice signal received from a counterpart terminal performing the call with the user terminal, and control at least one of the microphone and a speaker.

Based on the determined call connection status, the processor may be configured to determine the call connection status based on a volume of a voice signal of the user and noise comprised in the voice signal, and control at least one of the microphone and a speaker.

Based on the determined call connection status, the processor may be configured to increase, by a predetermined magnitude, a volume of a speaker outputting a voice signal received from a counterpart terminal performing the call with the user terminal.

Based on the determined call connection status, the processor may be configured to increase, by a predetermined magnitude, a sensitivity of the microphone.

Based on the determined call connection status, the processor may be configured to increase, by a predetermined magnitude, a strength of a noise filter to be applied to the voice signal.

In response to the voice signal being a call waiting command to place the call on hold, the processor may be configured to transmit a call waiting message to a counterpart terminal requesting the call through the communication module.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

Figure 1:
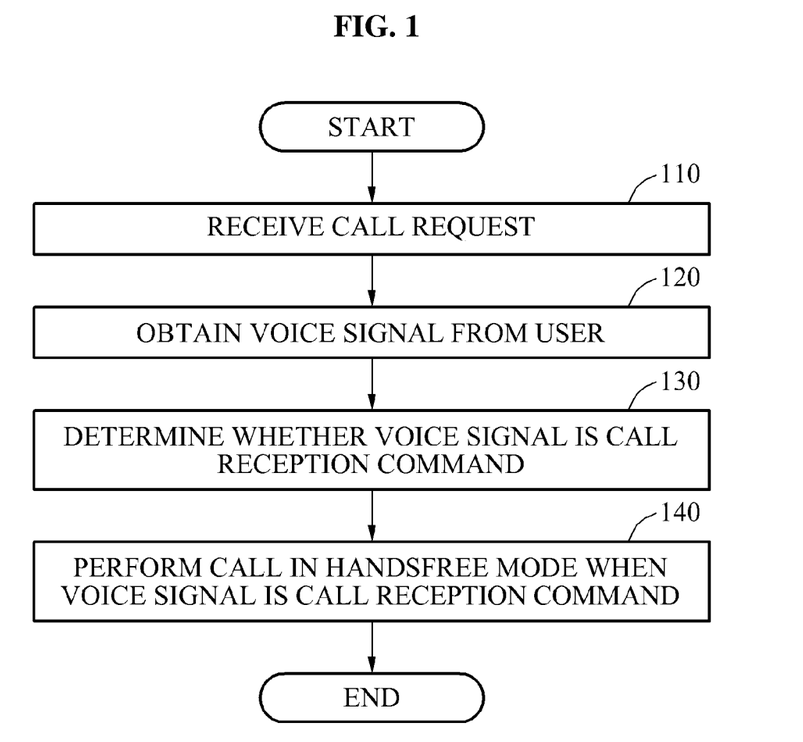
FIG. 1 is a flowchart illustrating an example of a method executing a call, in accordance with an embodiment.

FIG. 1 is a flowchart illustrating an example of a method executing a call, in accordance with an embodiment.

The method executing a call, hereinafter referred to as a call performing method, is performed at a processor included in a user terminal.

The user terminal may refer to a device that performs a voice call or a video call using a network and include, for example, a mobile phone, a smartphone, an interphone, a wired telephone, a personal digital assistant (PDA), a tablet, a laptop, and a portable terminal. The network may be provided in various forms, for example, a wired communications network and a wireless communications network. The network may be, for example, a public switched telephone network (PSTN) and a voice over Internet protocol (VoIP) network.

Referring to FIG. 1, in operation 110, the user terminal receives a call request. For example, the user terminal receives, through a network, the call request from a counterpart terminal performing a call to the user terminal. The counterpart terminal refers to a terminal requesting the call to be performed with the user terminal through the network.

In operation 120, the user terminal receives a voice signal from a user in response to the call request. However, in some circumstances, the user terminal may not receive the voice signal from the user in response to the call request. An operation to be performed by the user terminal in such a case will be described with reference to FIG. 3.

In operation 130, the user terminal determines whether the voice signal obtained from the user is a call reception command to receive the call. In one illustrative example, the user terminal converts the voice signal to text using voice recognition and determines whether the voice signal is the call reception command based on the text. The user terminal also determines whether the voice signal is a call waiting command for placing the call on hold. A method to be performed by the user terminal in such a case will be described with reference to FIG. 3.

In one embodiment, the call reception command refers to a command for allowing the user terminal to receive a call request, activate, and perform a call in response to the call request. The call reception command may include expressions used at commencement of a call, for example, "hello," "this is James Doe," and "yes," and various expressions used to perform the call, for example, "receive," "connect," and "access."

The call waiting command refers to a command to allow the user terminal to place a call on hold without receiving a call request. The call waiting command includes expressions used when the user is not able to receive a call, for example, "hold on," "wait for a minute," "I will call later," "I am busy," and "I am coming," and various expressions used to place the call on hold, for example, "wait," "postpone," and "delay." The call waiting command is set to define or include all expressions that are not determined to be the call reception command.

In one illustrative example, the call reception command and the call waiting command are preset by the user or a service provider, and deleted or added after the setting.

In operation 140, when the voice signal is determined to be the call reception command, the user terminal performs the call in a handsfree mode based on the call request. For example, the user terminal automatically activates a speakerphone in response to determining that the call reception command has been received to allow the user to perform the call without holding the user terminal. In an alternative example, once the call reception command has been determined, the user terminal may transmit an audio signal through the speaker requesting the user for a command on whether to activate the speakerphone. The user would have the option to either pick-up the user terminal or to perform the call through the speaker, without holding the user terminal.

Figure 2:
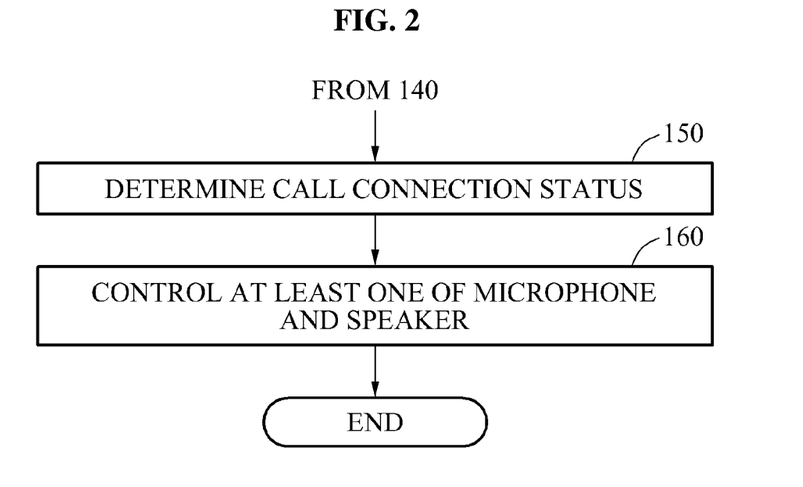
FIG. 2 is a diagram illustrating an example to control a user terminal by determining a call connection status of a call, in accordance with an embodiment.

FIG. 2 is a diagram illustrating an example to control a user terminal by determining a call connection status of a call, in accordance with an embodiment.

The user terminal executes or performs a call in a handsfree mode as described with reference to FIG. 1. The user terminal determines whether the call connection status of the call is favorable and controls the user terminal based on the determined connection status of the call. A detailed operation of the user terminal will be described hereinafter.

Referring to FIG. 2, in operation 150, the user terminal determines the call connection status of the call. For example, the user terminal determines the call connection status based on a voice signal obtained during the call, or a volume of the voice signal and noise, if any, included in the voice signal.

The user terminal determines the call connection status based on the voice signal obtained during the call. The user terminal recognizes the voice signal obtained during the call and converts the voice signal to text. The user terminal determines whether the call connection status is favorable based on the text. The voice signal obtained during the call includes at least one of a voice signal of a user of the user terminal and a voice signal received from a counterpart terminal.

For example, when the text is an expression used when the user is unable to distinguish speech of a counterpart speaker during the call, for example, "what did you say," "I cannot hear you," and "could you tell me again," or when the text is an expression indicating that the call connection status is unfavorable, for example, "poor call," "poor connection," "poor reception," and "unstable call," the user terminal may determine that the call connection status is unfavorable.

In addition, the user terminal may also determine the call connection status based on the volume of the voice signal obtained during the call and the noise, if any, included in the voice signal.

For example, when a ratio of the noise included in the voice signal to the volume of the voice signal obtained during the call is greater than a predetermined threshold, the user terminal determines that the call connection status is unfavorable.

For another example, when the user terminal does not recognize the voice signal due to a predetermined amount of noise included in the voice signal, the user terminal determines that the call connection status is unfavorable. The predetermined amount of noise may be defined based on a hardware capability and configuration of the user terminal. Also, the predetermined amount of noise may be a variable on whether the user terminal has a robust microprocessor able to discern a particular voice signal regardless of an amount of noise included in the voice signal.

When the text obtained by recognizing the voice signal is grammatically incorrect and unreadable text due to the noise included in the voice signal, the user terminal determines that the connection status is unfavorable. Thus, when the voice signal is not recognized because an amount of noise greater than a predetermined amount is included in the voice signal, or when the text obtained by recognizing the voice signal is the grammatically incorrect and unreadable text, the user terminal determines that the connection status of the call is unfavorable.

In operation 160, the user terminal controls at least one of the microphone and the speaker of the user terminal based on the determined call connection status.

In an example, the user terminal increases, by a predetermined magnitude, a volume of the speaker outputting a voice signal received from the counterpart terminal. When the user is unable to clearly hear the voice signal received from the counterpart terminal due to ambient noise, the user terminal increases the volume of the speaker to clearly deliver the voice signal.

In another example, the user terminal increases, by a predetermined magnitude, a sensitivity of the microphone obtaining a voice signal from the user. When the user terminal determines the call connection status to be unfavorable because a word expressed by the user of the user terminal is not clearly delivered to the counterpart terminal, the user terminal may be configured to automatically increase the sensitivity of the microphone. For example, when text obtained by recognizing the voice signal received from the counterpart terminal describes an expression conveying that the user is unable to hear the counterpart speaker performing the call with the user of the user terminal clearly, for example, "what did you say?," "I cannot hear you," and "could you tell me again". In the alternative, when the text describes an expression indicating that the call connection status is unfavorable, for example, "poor call," "poor connection," "poor reception," and "instable call," the user terminal increases the sensitivity of the microphone.

In still another example, the user terminal increases, by a predetermined magnitude, a strength of a noise filter to be applied to a voice signal obtained from the user. When the user terminal determines the call connection status to be unfavorable because a word expressed by the user of the user terminal is not clearly delivered to the counterpart terminal, the user terminal increases the strength of the noise filter.

The predetermined magnitude refers to a value set by the user or a service provider, and may be updated after the setting.

In one configuration, the user terminal performs operations 150 and 160 repeatedly until the call concludes.

Figure 3:
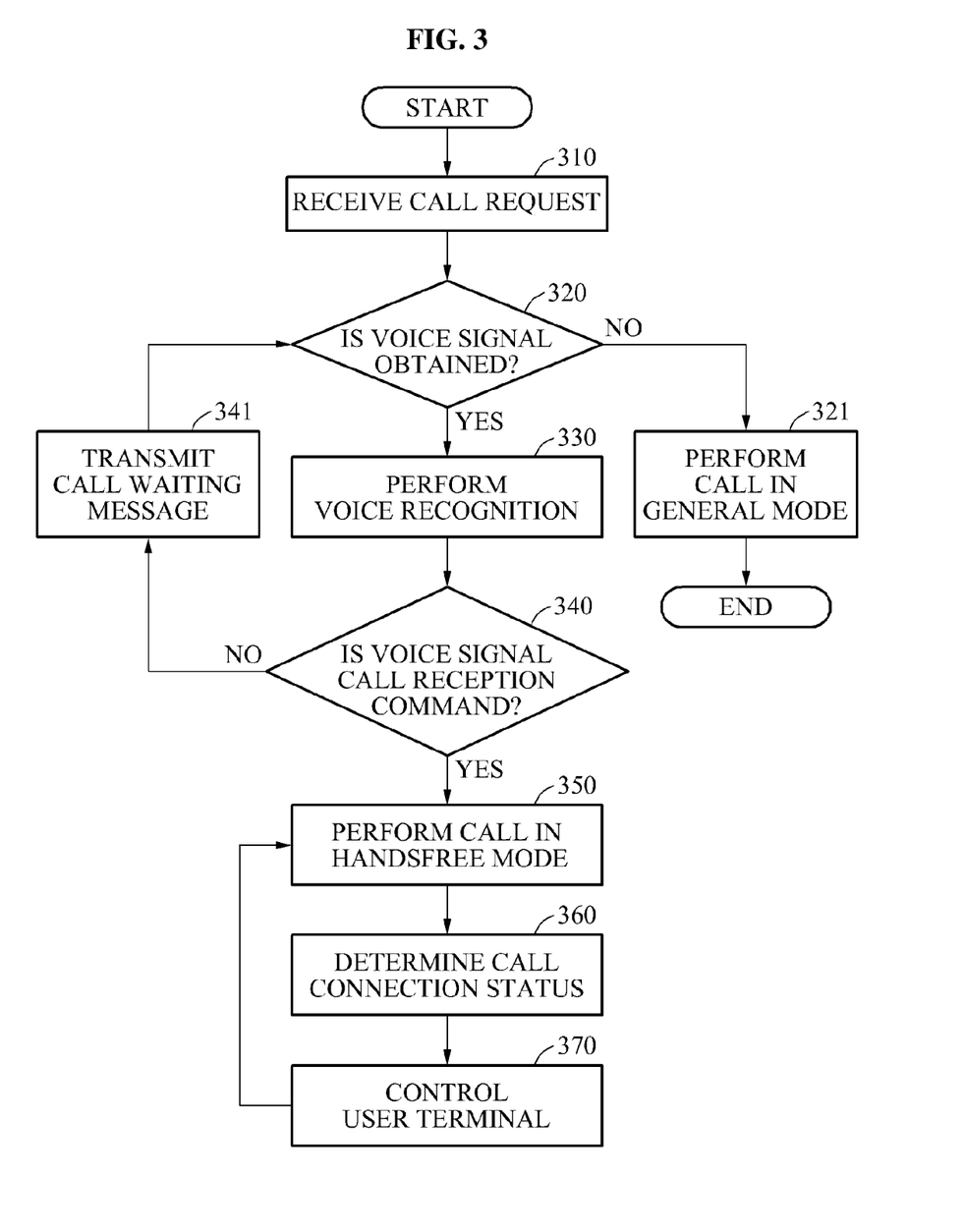
FIG. 3 is a flowchart illustrating a detailed example of a method to perform a call, in accordance with an embodiment.

FIG. 3 is a flowchart illustrating a detailed example of a method to perform a call, in accordance with an embodiment.

In one configuration, the method is performed by a processor provided in a user terminal.

Referring to FIG. 3, in operation 310, the user terminal receives a call request from a counterpart terminal.

In operation 320, the user terminal determines whether a voice signal is obtained from a user. The user terminal determines whether an input is detected from the user through at least one embedded interface.

For example, the user terminal determines whether the voice signal is obtained through a microphone, whether a keypad input is detected through a keypad, or whether a touch by the user is detected on a touch screen of the user terminal.

In operation 321, when the voice signal is not obtained, despite detection of the touch or the keypad input, the user terminal performs the call in a general mode in lieu of a handsfree mode. The general mode refers to a mode to allow the user to place the user terminal close to a face of the user using a hand to perform the call.

When the touch or the keypad input is detected and the voice signal is obtained, the user terminal performs the call in the general mode. That is, when the touch or the keypad input is detected, the user terminal performs the call in the general mode irrespective of whether the voice signal is obtained.

In operation 330, when the voice signal is obtained, the user terminal performs voice recognition on the obtained voice signal. As a result of the voice recognition, the user terminal obtains a text corresponding to the voice signal.

In operation 340, the user terminal determines whether the voice signal is a call reception command to receive the call based on the result of the voice recognition. The user terminal determines whether the voice signal is the call reception command or a call waiting command for placing the call on hold.

The call reception command refers to a command to allow the user terminal to receive the call request and perform the call. For example, the call reception command includes an expression used at commencement of the call, for example, "hello," "this is John Doe," and "yes," and various expressions used to perform the call, for example, "receive," "connect," and "access."

The call waiting command refers to a command to allow the user terminal to place the call on hold without receiving the call request. The call waiting command includes expressions used when the user is not able to receive the call, for example, "hold on," "wait for a minute," "I will call later," "I am busy," and "I am coming," and various expressions to place the call on hold, for example, "wait," "postpone," and "delay." The call waiting command is set to include all expressions that are not determined to be the call reception command.

In operation 341, when the voice signal is the call waiting command in lieu of the call reception command, the user terminal transmits a call waiting message to the counterpart terminal requesting the call.

For example, the user terminal performs voice recognition on a voice signal corresponding to the call waiting command. The user terminal transmits, as the call waiting message, text obtained by performing the voice recognition to the counterpart terminal Alternatively, the user terminal transmits, as the call waiting message, the voice signal corresponding to the call waiting command to the counterpart terminal In another example, the user terminal performs the voice recognition on the voice signal corresponding to the call waiting command, and transmits the obtained text, as the call waiting message, to the counterpart terminal. However, when the voice signal corresponding to the call waiting command is not recognizable or the text obtained after performing the voice recognition is grammatically incorrect and unreadable text, the user terminal may transmit, as the call waiting message, at least one of the voice signal corresponding to the call waiting command, a predetermined text, and the voice signal.

In operation 350, when the voice signal is the call reception command, the user terminal receives the call and performs the call in the handsfree mode. For example, the user terminal activates a speakerphone to allow the user to perform the call without using the hand of the user.

In operation 360, during the call, the user terminal determines a call connection status of the call.

In an example, the user terminal determines the call connection status based on a voice signal of the user obtained during the call or a voice signal received from the counterpart terminal. The user terminal converts the voice signal obtained during the call to text by performing the voice recognition on the voice signal. The user terminal then determines whether the call connection status is favorable based on the text obtained.

In another example, the user terminal determines the call connection status based on a volume of the voice signal obtained during the call and noise included in the voice signal. For example, when a ratio of the noise included in the voice signal to the volume of the voice signal obtained during the call is greater than a predetermined threshold value, the user terminal determines that the call connection status is unfavorable. The predetermined threshold refers to a value set by the user or a service provider, and may be updated after the setting.

When the voice signal is not recognizable due to the noise included in the voice signal, the user terminal determines the call connection status to be unfavorable. When the text obtained by recognizing the voice signal is grammatically incorrect and unreadable text due to the noise included in the voice signal, the user terminal determines the call connection status to be unfavorable. When the voice signal is not recognizable because a predetermined amount or more of the noise is included in the voice signal or when the text obtained by performing the voice recognition on the voice signal is grammatically incorrect and unreadable text, the user terminal determines the call connection status to be unfavorable.

In operation 370, the user terminal controls at least one of the microphone and the speaker of the user terminal based on the determined call connection status.

In an example, when the call connection status is determined to be unfavorable, the user terminal increases, by a predetermined magnitude, a volume of the speaker outputting a voice signal received from the counterpart terminal. Alternatively, the user terminal increases, by a predetermined magnitude, a sensitivity of the microphone obtaining a voice signal. Alternatively, the user terminal increases, by a predetermined magnitude, a strength of the noise filter to be applied to the voice signal obtained from the user using the microphone.

The predetermined magnitude refers to a value set by the user or a service provider, and be updated after the setting.

In one configuration, the user terminal performs operations 350 through 370 repeatedly until the call is terminated. For example, the user terminal may repeatedly perform operations 350 through 370 every predetermined cycle.

Figure 4:
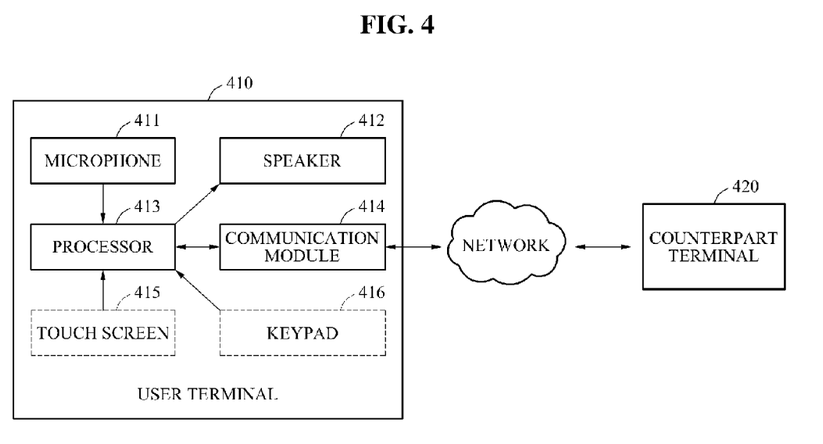
FIG. 4 is a diagram illustrating an example of a configuration of a user terminal, in accordance with an embodiment.

FIG. 4 is a diagram illustrating an example of a configuration of a user terminal 410, in accordance with an embodiment.

Referring to FIG. 4, the user terminal 410 includes a microphone 411, a speaker 412, a processor 413, and a communication module 414. The user terminal 410 may further include at least one of a touch screen 415 and a keypad 416.

The microphone 411 obtains a voice signal from a user of the user terminal 410. The microphone 411 is activated after the user terminal 410 receives a call request from a counterpart terminal 420. The microphone 411 obtains the voice signal from the user after the call request is received. A sensitivity of the microphone 411 is controlled by the processor 413 based on a call connection status of a call.

The speaker 412 outputs a voice signal received from the counterpart terminal 420. A volume of the speaker 412 may be controlled by the processor 413 based on the call connection status.

The processor 413 is connected to at least one of the microphone 411, the speaker 412, the communication module 414, the touch screen 415, and the keypad 416, and controls an overall operation of the user terminal 410.

In an example, the processor 413 determines whether the voice signal obtained through the microphone 411 is a call reception command. In addition, the processor 413 determines whether the voice signal obtained through the microphone 411 is a call waiting command. When the voice signal is the call reception command, the processor 413 performs the call in a handsfree mode using the communication module 414, and controls at least one of the microphone 411 and the speaker 412 by determining the call connection status. In an alternative configuration, the processor 413 generates a signal at least one of the microphone 411 and the speaker 412 and requests the user to indicate whether the handsfree mode is to be enabled or whether the user will be manually picking up the call. The signal may be, for example, "handsfree mode ok" or "accept handsfree mode". If the user responds "yes", then the processor 413 would continue to perform the call in the handsfree mode.

The processor 413 determines the call connection status based on text obtained by recognizing a voice signal of the user or a voice signal received from the counterpart terminal 420. The processor 413 determines the call connection status based on a volume of the voice signal of the user and noise included in the voice signal.

The processor 413 increases, by a predetermined magnitude, a volume of the speaker 412 outputting the voice signal received from the counterpart terminal 420 based on the determined call connection status. The processor 413 increases, by a predetermined magnitude, a sensitivity of the microphone 411 obtaining the voice signal of the user based on the determined call connection status. The processor 413 increases, by a predetermined magnitude, a strength of a noise filter to be applied to the voice signal of the user based on the determined call connection status.

When the voice signal of the user is the call waiting command, the processor 413 transmits a call waiting message to the counterpart terminal 420, without receiving the call. For example, the processor 413 transmits, as the call waiting message, text obtained by recognizing the voice signal of the user or a voice signal corresponding to the call waiting command to the counterpart terminal 420. Alternatively, the processor 413 transmits, as the call waiting message, text or a voice signal predetermined by the user or a service provider to the counterpart terminal 420.

In another example, the processor 413 performs the call by additionally determining whether a touch by the user is detected through the touch screen 415 or an input from the user is detected through the keypad 416. For example, when the touch or the keypad input is detected, the processor 413 performs the call in a general mode, in lieu of the handsfree mode, irrespective of whether the voice signal is obtained.

The communication module 414 receives the call request from the counterpart terminal 420 through a network. The communication module 414 receives the call through the network and performs the call with the counterpart terminal 420. For example, when the voice signal obtained from the user is the call waiting command, the communication module 414 transmits the call waiting message to the counterpart terminal 420 through the network.

The network connects the user terminal 410 to the counterpart terminal 420 to allow the call to be performed therebetween, and be provided in various forms, for example, a wired communications network and a wireless communications network. The network may be, for example, a PSTN and VoIP network.

The touch screen 415 detects the touch by the user. The touch screen 415 detects the touch by the user after the call request is received from the counterpart terminal 420.

The keypad 416 detects the keypad input from the user. The keypad 416 detects the keypad input from the user after the call request is received from the counterpart terminal 420. The keypad 416 is an interface including keys to input numbers, characters, and the like.

According to example embodiments described herein, a user is enabled to conveniently perform a call through voice recognition and controlling a user terminal during the call.

The method and the user terminal 410 allow a user to conduct a call with another user when the user is unable to control the user terminal directly. For example, when the user terminal is remotely located from the user and when the user performs another task despite a close proximity to the user terminal.

According to various embodiments described herein, a user may perform a call without inconvenience that may occur due to a distance between the user and a user terminal by receiving the call through voice recognition and controlling the user terminal during the call.

According to various embodiments described herein, when a user is in a difficult situation to receive a call, the user may receive a more customized call service by transmitting, as a call waiting message, text obtained by converting a voice signal corresponding to a call waiting command based on voice recognition.

According to embodiments described herein, user convenience in performing a call is improved by controlling a microphone or a speaker of a user terminal based on text obtained by recognizing a voice signal obtained during the call, a volume of the voice signal, and noise included in the voice signal.

The units, module, and terminals described herein may be implemented using hardware components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIGS. 1-3 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 1-3.

Program instructions to perform a method described in FIGS. 1-3, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to be performed by a user terminal, the method comprising:
    obtaining a first voice signal in response to a call request received from a counterpart terminal through a mobile communication network;
    identifying the first voice signal from a user as a call reception command to receive a call or as a call waiting command indicating that the user is not able to receive the call; and
    without receiving the call, transmitting a call waiting message indicating that the user is not able to receive the call to the counterpart terminal requesting the call through the mobile communication network when the first voice signal is identified as the call waiting command,
    wherein the transmitting comprises transmitting, as the call waiting message, at least one of
    a text obtained by recognizing the first voice signal, the first voice signal being identified as the call waiting command, or
    a predetermined text when the first voice signal is not recognizable or the text obtained by recognizing the first voice signal is grammatically incorrect.

2. The method of claim 1, further comprising:
    receiving the call when the first voice signal is identified as the call reception command; and
    controlling the user terminal based on a call connection status of the call.

3. The method of claim 2, further comprising:
    determining the call connection status by recognizing a second voice signal obtained from the user or a third voice signal received from the counterpart terminal.

4. The method of claim 2, further comprising:
    determining the call connection status based on a volume of a second voice signal obtained from the user and noise comprised in the second voice signal.

5. The method of claim 2, wherein the controlling comprises
    controlling a volume of a speaker outputting a third voice signal received from the counterpart terminal based on the call connection status.

6. The method of claim 2, wherein the controlling comprises
    controlling a sensitivity of a microphone obtaining a second voice signal from the user based on the call connection status.

7. The method of claim 2, wherein the controlling comprises
    controlling a strength of a noise filter to be applied to a second voice signal obtained from the user based on the call connection status.

8. The method of claim 1, further comprising:
    performing the call in a general mode when at least one of a touch and a keypad input is obtained from the user.

9. A non-transitory computer-readable storage medium comprising a program comprising instructions to cause a computer to perform the method of claim 1.

10. A user terminal, comprising:
    a microphone configured to obtain a first voice signal in response to a call request received from a counterpart terminal through a mobile communication network; and
    a processor configured to
        identify the first voice signal from a user as a call reception command to receive a call or as a call waiting command indicating that the user is not able to receive the call, and
        without receiving the call, transmit a call waiting message indicating that the user is not able to receive the call to the counterpart terminal requesting the call through the mobile communication network when the first voice signal is identified as the call waiting command,
    wherein the processor transmits, as the call waiting message, at least one of
    a text obtained by recognizing the first voice signal, the first voice signal being identified as the call waiting command, or
    a predetermined text when the first voice signal is not recognizable or the text obtained by recognizing the first voice signal is grammatically incorrect.

11. The user terminal of claim 10, wherein the processor is further configured to
    receive the call when the first voice signal is identified as the call reception command, and
    control at least one of the microphone and a speaker comprised in the user terminal based on a call connection status of the call.

12. The user terminal of claim 11, wherein the processor is further configured to:
    determine the call connection status by recognizing a second voice signal obtained from the user or a third voice signal received from the counterpart terminal.

13. The user terminal of claim 11, wherein the processor is further configured to:
    determine the call connection status based on a volume of a second voice signal obtained from the user and noise comprised in the second voice signal.

14. The user terminal of claim 11, wherein the processor is further configured to control a volume of a speaker outputting a third voice signal received from the counterpart terminal.

15. The user terminal of claim 11, wherein the processor is configured to control a sensitivity of the microphone obtaining a second voice signal from the user based on the call connection status.

16. The user terminal of claim 11, wherein the processor is configured to control a strength of a noise filter to be applied to a second voice signal obtained from the user based on the call connection status.

17. The method of claim 1, wherein, if the first voice signal is not identified as the call reception command, then the first voice signal is identified as the call waiting command.

18. The method of claim 4, wherein the determining the call connection status further comprises determining the call connection status to be unfavorable if a ratio of the noise to the volume of the second voice signal is greater than a threshold.

19. The method of claim 1, wherein the call waiting message comprises an expression indicating an intent of the user to call later.

20. The method of claim 1, wherein the call waiting message comprises an expression indicating the call is to be postponed.

21. The method of claim 1, further comprising:
receiving the call and performing the call in a handsfree mode when the first voice signal is identified as the call reception command.

22. The method of claim 21, wherein the receiving the call and performing the call in the handsfree mode comprises
determining the call connection status by measuring a signal quality of the call, and
performing the call in the handsfree mode based on the call connection status.

23. The user terminal of claim 10, wherein the processor is further configured to:
receive the call and perform the call in a handsfree mode when the first voice signal is identified as the call reception command.

* * * * *